April 5, 1927.
R. B. FAGEOL
1,623,583
PARALLEL BAR BUMPER
Filed June 3, 1925
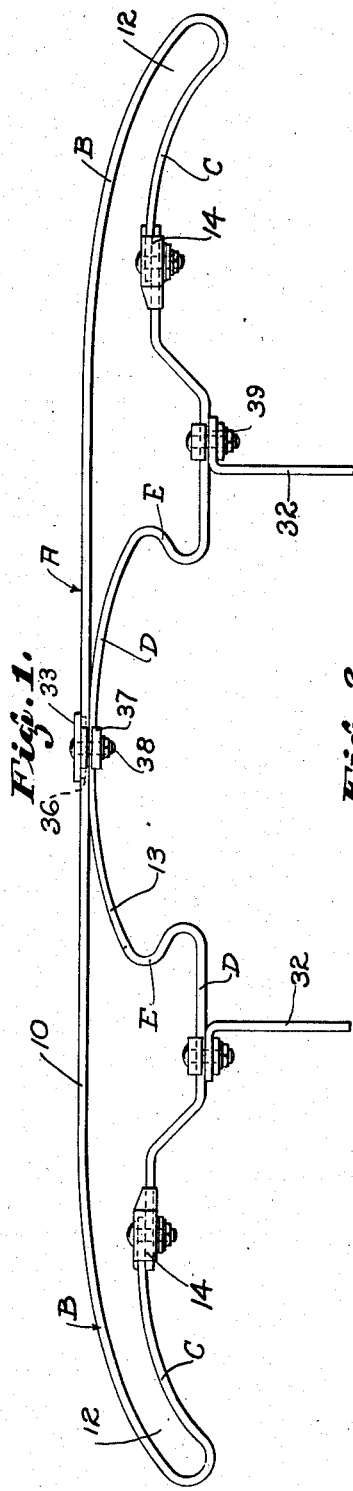
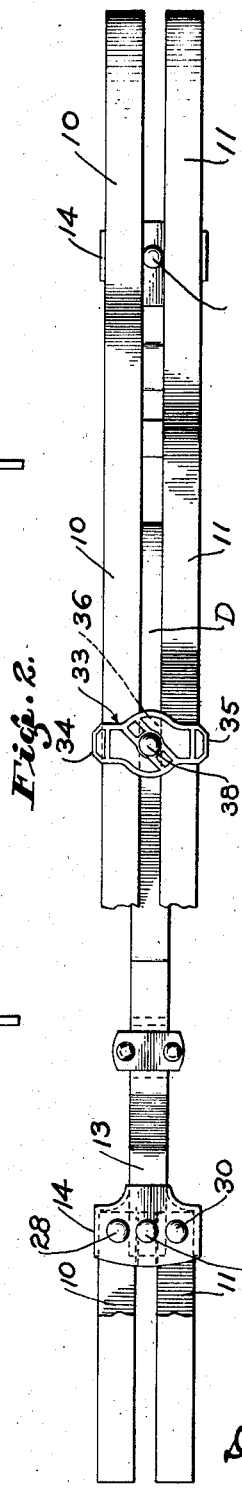
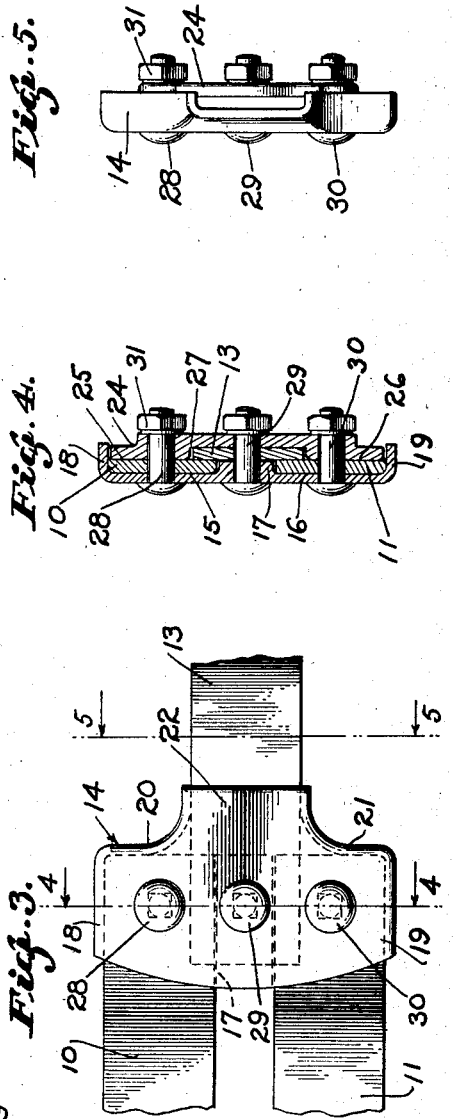
INVENTOR.
Rollie B. Fageol.
BY
Dewey, Strong, Townsend & Loftus
ATTORNEYS.

Patented Apr. 5, 1927.

1,623,583

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

PARALLEL-BAR BUMPER.

Application filed June 3, 1925. Serial No. 34,538.

This invention relates to automobile accessories, and particularly pertains to an automobile bumper.

It is the principal object of the present invention to provide an automobile bumper with a wide impact section extending completely across the front of the vehicle and of a length to protect the wheel fenders, and which impact structure is suitably assembled with a resilient back bar whereby an all-resilient bumper will be provided and may be conveniently supported in a position to be interposed between the vehicle and an object with which it might collide.

The present invention contemplates the use of parallel resilient bumper bars extending across the front of a vehicle and terminating in looped ends, which ends occur at points in the rear of the impact portion of the bars and are there rigidly connected to a resilient cross bar assembled to cooperate with the impact bar in a manner to form an all resilient bumper structure.

The invention is illustrated by way of example in the accompanying drawings, in which:

Fig. 1 is a view in plan showing the completely assembled bumper.

Fig. 2 is a view in front elevation showing the bumper with parts broken away to more clearly disclose the manner of connection between the parallel impact bars and the rear connecting bar.

Fig. 3 is an enlarged fragmentary view in section showing the manner of connecting the front and rear bars.

Fig. 4 is a view in vertical section through the structure shown in Fig. 3 more clearly showing the assembled relation of the ends of the front and rear bars.

Fig. 5 is a view in end elevation showing the bar connecting plate.

Referring more particularly to the drawings, 10 and 11 indicate impact bars of a bumper. These bars extend parallel to each other and are intended to be disposed in a horizontal position transversely of the end of an automobile frame. The opposite ends of each of the bars are recurved to form loops 12 which are superposed in vertically aligned relation to each other, as indicated in Figs. 1 and 2 of the drawings.

By reference to Fig. 1, it will be seen that the bumper bars have a substantially flat front impact face generally indicated at A and that rearwardly curved portions B are formed as continuations of said impact face at the opposite ends thereof, said rearwardly curved portions being bent upon themselves to form the loops 12 and to provide a terminating curved back loop section C. The portions C terminate substantially in the rear of the ends of the straight portions A of the impact bars, as shown in Fig. 1.

It is desired to rigidly fasten the bars 10 and 11 in parallel relation to each other and to rigidly connect them to a back bar 13. As shown in Fig. 2 of the drawings, the parallel bars 10 and 11 are spaced a distance apart less than the vertical width of the back bar 13, and are rigidly held in this position by fastening plates 14. It will, of course, be understood that the width of the space between the parallel bars and the vertical width of the back bar bear no definite relation to each other and may be varied as convenience dictates.

The fastening plate 14 is formed with two parallel channels 15 and 16 separated by a rib 17. The opposite horizontal edges of these channels are flanged as indicated at 18 and 19 in Fig. 4. The vertical widths of the channels 15 and 16 agree substantially with the vertical dimension of the bumper bars 10 and 11, which are intended to seat in said channels and to be spaced relative to each other by the intermediate rib 17. The channels 15 and 16 are opened at one end to receive the ends of the bars 10 and 11, but are substantially closed at their opposite ends by continuations 20 and 21 of the flanges 18 and 19, thus forming limiting shoulders against which the ends of the bars 10 and 11 abut.

The body portion of the fastening plate 14 continues beyond the ends of the parallel bars 10 and 11, as indicated at 22, and is of a reduced width agreeing substantially with the width of the back bar 13. The opposite horizontal edges of this extending portion 22 of the plate are bounded by continuations of the flanges 20 and 21, thus forming a channel into which the end of the back bar 13 seats, and, as shown in Fig. 3 of the drawing, permitting the back bar 13 to overlap the contiguous edges of the parallel bars for a desired distance in the rear of the main body of the fastening plate 14. The back bar 13 will therefore lie flat against the flat face of the rib 17 between channels 15 and 16 and against portions of the aligned flat faces of the bars 10 and 11. In this overlapping relation the parallel bars 10 and 11 and the rack bar 13 are rigidly fastened together. This is accomplished by the use of a clamping plate 24 disposed between the flanges 18 and 19 of the fastening plate 14, and which plate has aligned faces 25 and 26 bearing against the back faces of the parallel bars 10 and 11 and between which aligned faces occurs a channel 27 for accommodating the back bar 13.

When the fastening plate 14, the parallel bars 10 and 11, the back bar 13 and the clamping plate 24 are in assembled relation to each other, bolt openings of the various members will be in register to receive bolts 28 and 29 and 30. The bolt 28 passes through the fastening plate and opening in the parallel bar 10 and a registering opening in the clamping plate 24. The bolt 29 passes through an opening in the rib portion 17 of the fastening plate, then through an opening in the back bar 13 and an opening in the clamping plate 24. The bolt 30 passes through the body of the fastening plate 14, an opening in the lower parallel bar 11, and a registering opening in the clamping bar 24.

By reference to Fig. 3 of the drawings, it will be seen that these openings and the bolts accommodated thereby are in vertically aligned positions relative to each other. Suitable lock nuts 31 are applied to each of the bolts and thus rigidly fasten the contiguous ends of the parallel bars and the back bar.

As here shown in Fig. 1 of the drawing, the back bar 13 serves three purposes in the present instance; that of rigidly connecting and supporting the ends of the bars 10 and 11 in parallel relation to each other, as well as affording connecting means for adjustable mounting arms 32 and also providing a resilient truss in the back of the center of the parallel bars, which truss portion is connected to the center of the impact section A of the parallel bars in a manner to resiliently reinforce the bars and to support the bars in parallel relation to each other at a point intermediate their lengths.

This connecting structure comprises a front plate 33 formed with upper and lower horizontal flanges 34 and 35 and an intermediate lug 36, which flanges and lug form parallel channels into which the bars 10 and 11 fit. A back clamping plate 37 is secured in the rear of the bar 13 and cooperates with the front plate 33 in holding the bars in rigid relation to each other by action of a clamping bolt 38 which passes between the bars 10 and 11.

The back bar 13, as shown in Fig. 1 of the drawings, is formed with a central arcuate portion resting at its center against and overlapping portions D of the rear faces of the parallel bars 10 and 11. The arcuate center D of the back bar curves away from the center of the impact bar and is then bent into reverse curved portions E forming short reverse loops. The opposite ends of the bar are then bent outwardly in a common plane to form straight lengths D' upon which mounting arms 32 may be adjustably clamped by clamping structures 39, it being understood that such adjustment is desirable to accommodate cars having different widths of frames.

The terminating ends of the bars are then suitably bent to be properly positioned so that they may assume the relation shown in Figs. 3 and 4 of the drawings and be thus clamped between the fastening plates 14 and the clamping plates 24.

Thus it will be seen that the structure here disclosed provides a parallel bar impact structure extending entirely across the front of the vehicle and terminating in resilient loops for protecting the wheel fenders in connection with a resilient back bar for causing cooperation of the loops and reinforcement of the center of the impact bars.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. In an automobile bumper, the combination with a pair of parallel front bars spaced in relation to each other, a back bar of greater vertical width than the space between the front bars and being disposed in overlapping relation to the ends of the front bars, means for holding said parallel bars in spaced relation to each other, means for positioning the back bar in overlapping relation to the ends of the parallel bars, and means whereby said front and back bars may be clamped in said assembled positions.

2. In an automobile bumper, the combination of a pair of flat parallel front bars spaced in relation to each other, a flat back bar, a fastening plate formed with spaced parallel recesses for receiving the ends of said parallel bars, a clamping plate formed with a central recess for receiving the end of the back bar, and clamping means for securing said fastening plate and clamping plate in rigid relation to each other while fastening the front and back bars with their ends in overlapping relation to each other and abutting against the ends of their respective recesses.

3. In an automobile bumper, the combination of a pair of flat parallel front bars spaced in relation to each other, a flat back bar, a fastening plate formed with spaced parallel recesses for receiving the ends of said parallel bars, a clamping plate formed with a central recess for receiving the end of the back bar, clamping means for securing said fastening plate and clamping plate in rigid relation to each other while fastening the front and back bars with their ends in overlapping relation to each other and with their ends abutting against the ends of their respective recesses, and flange means for preventing lateral and longitudinal movement of the fastening plate and the clamping plate with relation to each other and with relation to the bars.

4. In an automobile bumper, the combination of a pair of flat parallel front bars spaced in relation to each other and terminating in re-curved loop ends, a flat back bar of vertical width greater than the distance between the terminating ends of the front bars, said back bar being of a length to overlap the ends of the front bars and to span the space there between, a fastening plate formed with parallel recesses into which the terminating ends of the front bars may seat, said recesses having ends against which the ends of the front bars abut, a clamping plate formed with a recess in which the end of the back bar seats while in its overlapping position with relation to the front bars and bolts passing through the fastening plate, the clamping plate and the front and back bars to rigidly hold the bars in their clamping positions between the fastening plate and the clamping plate.

5. In an automobile bumper, the combination of a pair of flat parallel front bars spaced in relation to each other and terminating in re-curved loop ends, a flat back bar of a vertical width greater than the distance between the terminating ends of the front bars said back bar being of a length to overlap the ends of the front bars and to span the space there between, a fastening plate formed with parallel recesses into which the terminating ends of the front bars may seat, said recesses having ends against which the ends of the front bars abut, a clamping plate formed with a recess in which the end of the back bar seats while in its overlapping position with relation to the front bars and bolts passing through the fastening plate, the clamping plate and the front and back bars to rigidly hold the bars in their clamping positions between the fastening plate and the clamping plate, said fastening plate being formed with an extension having a channel into which the back bar seats.

ROLLIE B. FAGEOL.